Patented Feb. 14, 1939

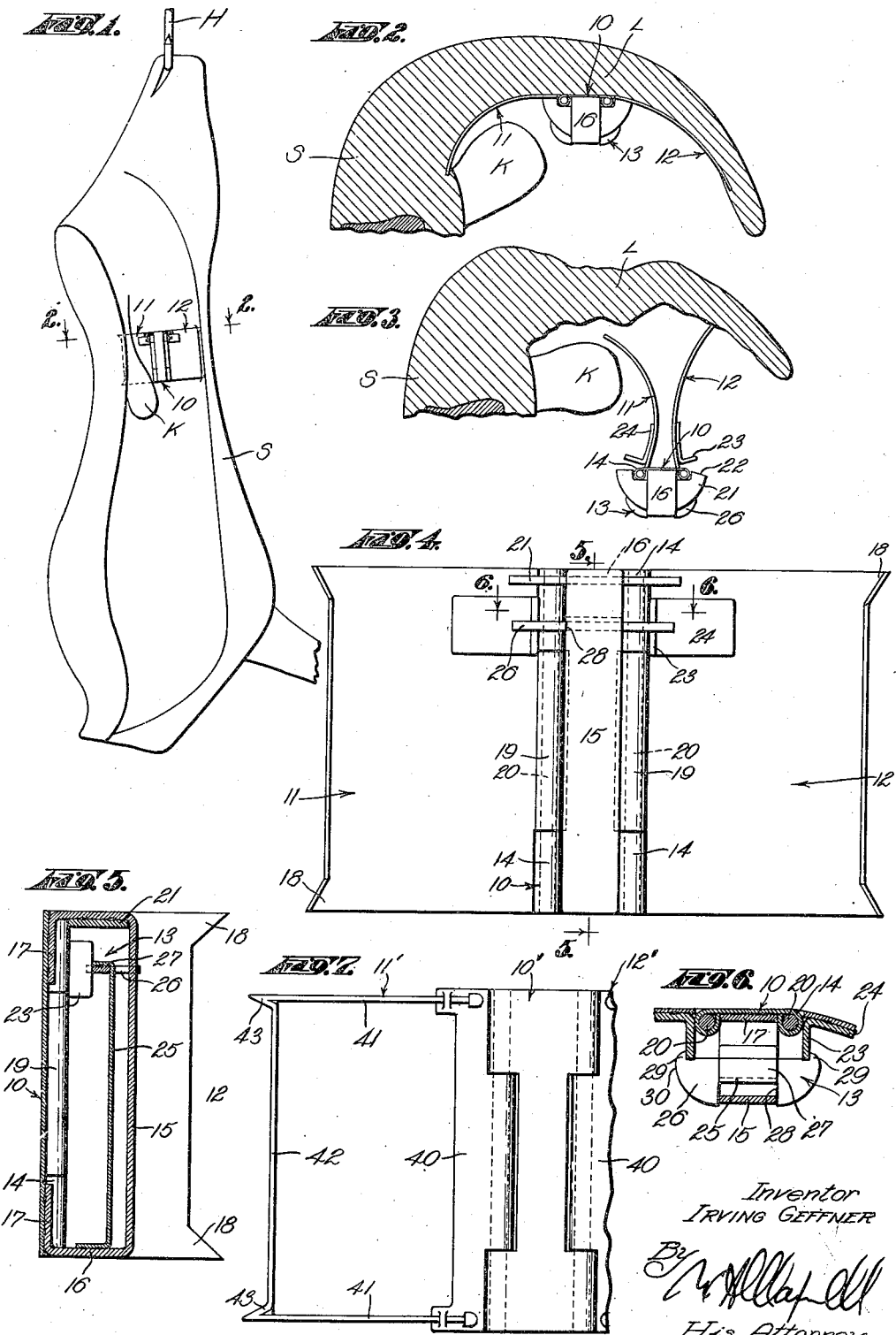

2,146,815

UNITED STATES PATENT OFFICE 2,146,815

DEVICE FOR PREVENTING DISTORTION OF MEAT CARCASSES

Irving Geffner, Los Angeles, Calif.

Application October 19, 1936, Serial No. 106,379

17 Claims. (Cl. 17—44)

This invention relates to a device for shaping or forming a carcass and relates more particularly to a device for preventing distortion of a freshly slaughtered beef carcass, or the like. It is a general object of the invention to provide a simple, practical and effective device for preventing distortion of the loin portion of a freshly slaughtered meat carcass.

When a meat carcass has been slaughtered, split and dressed it is the general practice to hang its sides for chilling and refrigeration. Due to the weight of the fore quarter of a side hung in this manner the loin portion often becomes distorted, that is, the loin portion between the hind leg and the short ribs shrinks or is drawn inwardly. The loin portion is one of the choicest cuts of the meat and its distortion renders it unsightly and less salable, and may interfere with the shrouding of the side.

Another object of this invention is to provide a device that may be easily and quickly applied to a side or carcass of beef, or the like, to prevent undesirable distortion of its loin portion and to maintain said portion in the proper salable shape.

Another object of the invention is to provide a device of the character mentioned that may be readily used or operated with only one hand.

Another object of this invention is to provide a device of the character mentioned that may be very easily freed or removed from the meat when the side or carcass has set or stiffened.

Another object of this invention is to provide a device of the character mentioned that may be applied to and removed from the side or carcass without appreciable injury to the same, and without in any way injuring the choice tenderloin portion.

Another object of this invention is to provide a device of the character mentioned that embodies a multiplicity of hingedly or pivotally connected members that may be readily rocked or swung into the meat shaping position and that indefinitely remain in such position until deliberately removed.

An important object of the present invention is to provide a device of the character mentioned in which the hingedly or pivotally connected members may be separately or individually rocked or swung free of the carcass or meat when the device is to be removed, thus facilitating the easy disengagement of the device from the meat.

A further object of this invention is to provide a device of the character mentioned that embodies a simple, and particularly effective latch means for latching the several sections or members in their operative positions, and that serves to hold the device in place during the handling of the carcass or side and that is easily released by merely grasping the handle of the device.

The various objects and features of the invention will be fully understood from the following detailed description of typical preferred forms and applications of the invention, throughout which description reference is made to the accompanying drawing, in which:

Fig. 1 is an elevation view of the inner side of a hung side of beef illustrating one form of device of the present invention in the operative position on its inner side. Fig. 2 is an enlarged transverse detailed sectional view taken substantially as indicated by line 2—2 on Fig. 1. Fig. 3 is a view similar to Fig. 2 illustrating the configuration of the loin portion prior to the application of the device and showing the device in position for arrangement on the side. Fig. 4 is an enlarged elevation of the inner side of the device in the extended or operative position. Fig. 5 is a vertical detailed sectional view taken as indicated by line 5—5 on Fig. 4. Fig. 6 is a fragmentary horizontal detailed sectional view taken as indicated by line 6—6 on Fig. 4 and Fig. 7 is a fragmentary elevation of the outer side of another embodiment of the invention.

The present invention is adapted to be employed to prevent distortion of the loin portions of carcasses of beef, hogs, sheep, etc., and may be varied somewhat in shape and size when intended for a specific application or use. In the following detailed disclosure I will describe two typical forms of the invention, it being understood that the invention is not to be construed as limited or restricted to the specific forms or applications about to be described.

The form of the invention illustrated in Figs. 1 to 6, inclusive, of the drawing, includes an intermediate or body member 10, side members 11 and 12 hingedly or pivotally connected with the body member 10 and means 13 for latching the members 10, 11 and 12 in the operative position where they conform to and shape the loin portion of the side or carcass.

The section or member 10 which I have termed the body member is the middle or intermediate member of the device and serves to pivotally carry and connect the two side members 11 and 12. In practice the member 10 may be a simple, integral plate-like part elongated and rectangular in shape. Each longitudinal edge portion of the body member 10 may be provided with longitudinally spaced tongues rolled into the form of tubes 14. These tubes 14 are, of course, integral with the body member 10. The invention provides a handle on the body member 10 to facilitate the operation and manipulation of the device. The handle is provided at the inner or rear side of the body member 10 and may be generally U-shaped in longitudinal cross section to comprise a grip 15 and ends 16. The ends 16 are provided with inturned flanges 17 which are welded or otherwise fixed to the rear surface of the body member 10 to secure the handle to the body member. The grip 15 of the handle may be straight and is suitable spaced from the body member 10 to be conveniently grasped by the user. The above described handle may extend between the upper and lower ends of the body member 10 to have its ends 16 at the ends of the body member. The handle is preferably somewhat narrower than the body member 10 as illustrated in the drawing. The outer or active surface of the body member 10 is adapted to engage against the interior surface of the loin portion L of the side S or carcass of beef, or the like. As the body member 10 engages the inner surface of the loin portion L substantially intermediate the vertical or side extremities of the loin portion, the body member may be flat, as illustrated.

The side members 11 and 12 are the principal carcass or meat engaging elements of the device. The members 11 and 12 may be of the same length as the body member 10 but are much wider than the body member. In accordance with the invention the members 11 and 12 are shaped to form or shape the loin portion L of the side S. The members 11 and 12 are curved about substantially vertical or longitudinal axes to lie against the internal surface of the loin portion L and give the loin portion its desired rounded configuration. The curvature of the members 11 and 12 may extend throughout the lengths of the members. In the embodiment of the invention being described the members 11 and 12 present continuous or unbroken smooth surfaces for contacting the carcass. The member 11 may be somewhat narrower than the member 12 and may have a more abrupt curvature than the member 12 to properly shape the loin portion L adjacent the kidney K. Fig. 2 of the drawing illustrates the members 11 and 12 in shaping or distortion preventing relation to the loin portion L and illustrate the curvature of the members. The invention includes parts or teeth 18 at the outer ends of the members 11 and 12 to bite into the side S or carcass to assist in retaining the device in position thereon. In the simple form of the invention illustrated a tooth 18 is provided at the outer corner portion of each member 11 and 12 and is integral with its respective member.

The members 11 and 12 are hingedly or pivotally connected with the intermediate member or body member 10 so that they may be swung between the collapsed or inoperative position with their convex surfaces in spaced opposition, as illustrated in Fig. 3, and the operative position illustrated in Fig. 2 where the assembly of the three members 10, 11 and 12 presents a generally arcuate convex surface for cooperating with the internal surface of the loin portion L of the side S.

The means for pivotally connecting the members 11 and 12 to the body member 10 may include an integral tongue part on the inner edge of each member rolled into the form of a tube 19. The tubes 19 are located between the spaced tubes 14 of the body member 10 and are axially aligned with the tubes 14. Hinge pins or pivot pins 20 extend through the aligned hinge tubes 14 and 19 to pivotally connect the members 11 and 12 with the body member 10. It is to be understood that the hinge tubes 14 and 19 project from the rear surfaces of the members 10, 11 and 12 leaving the forward or active surfaces of the members regular and uninterrupted by projections or openings. A stop 21 is secured to one end 16 of the handle and has forward edges 22 engageable by the rear surfaces of the members 11 and 12 to stop or position the members in their operative positions. The stop 21 may be welded to the handle end 16, as illustrated. It is important to note that the body member 10 and the side members 11 and 12 are pivotally connected and related so that their outer or forward sides may present a continuous unbroken surface for bearing on the interior of the loin portion L whereby the device does not have any openings or cracks through which the meat may bulge or extend. The device constructed in this manner prevents the formation of ridges or bulges on the interior of the loin portion L.

The means 13 is operable to releasably latch the three members 10, 11 and 12 in the operative positions where their active forward faces constitute a continuous, generally convex surface for engaging against the inner side of the lower portion L to shape or form the same. The latch means 13 includes a fixed abutment or catch 23 on each member 11 and 12. The catches 23 may be simple members having base flanges 24 riveted or otherwise fixed to the rear surfaces of the members 11 and 12. The catches 23 are positioned at the inner edge portions of the members 11 and 12 adjacent one end of the device. In the construction illustrated the catches 23 are substantially parallel when the members 10, 11 and 12 are in the operative positions. The latch means 13 further includes a spring arm or spring 25 having an end attached to one end 16 of the handle and extending longitudinally toward the catches 23. The major portion of the spring 25 is in spaced adjacent relation to the inner side of the handle grip 15 so that it may be readily engaged or depressed by the fingers of the hand grasping the handle.

A latch 26 is fixed to the free end or outer end of the spring 25. In practice the latch 26 may be welded to an inturned finger 27 on the spring 25. The latch 26 may have a notch 28 receiving the spring 25 and shiftably receiving the grip 15 of the relatively stationary handle. The side walls of the notch 28 may cooperate with the longitudinal edges of the handle grip 15 to guide the latch 26 and to prevent lateral distortion or flexing of the spring 25. The latch 26 is provided with fingers 29 at its outer ends that face inwardly or toward the rear surfaces of the members 11 and 12. The fingers 29 have rounded or curved outer edges 30 and flat inner edges. When the members 11 and 12 approach the operative positions the rear edges of the catches 23 cam against the curved edges 30 of the fingers 29 to flex the spring 25 outwardly and when the members 11 and 12 are stopped in their operative positions by the stop 21, the fingers 29 snap into latching cooperation with the catches 23 with their straight active edges in cooperation with the outer surfaces of the catches to latch or hold the three members 10, 11 and 12 in their proper operative positions. The latch fingers 29 may be readily released from the catches 23 by merely grasping the handle grip 15 and engaging or depressing the spring 25.

When the side S of a freshly slaughtered carcass is hung on a hook H cooperating with a tendon in the hind quarter, as illustrated in Fig. 1, the substantial weight of its fore quarter tends to stretch or at least distort the loin portion L somewhat in the manner illustrated in Fig. 3. Immediately following the hanging of the side S the operator or user brings the device to the inner side of the loin portion L in a collapsed condition, as shown in Fig. 3, and forces the device against the interior of the loin portion L with considerable force to pivot or swing the side members 11 and 12 to their extended or operative positions. This also automatically enters the prongs or teeth 18 in the carcass or side S and brings the active convex surfaces of the device in proper contact with the interior of the loin portion L. The device may be applied as just described, with only one hand.

It will be observed that the thrusting or forcing of the device against the inner side of the loin portion L results in a forced or positive outward movement of the members 11 and 12, due to what may be termed a toggle action resulting from inward movement of the member 10 between them. This positive outward movement of the members 11 and 12 assures the proper entrance of the teeth 18 in the side S. The latch 26 operates to automatically latch the members 10, 11 and 12 in their operative positions when the device is forced or thrust against the interior of the loin portion L, as described above. The latch fingers 29 automatically snap into engagement with the catches 23 to positively latch the members 11 and 12 in their extended or operative positions with relation to the intermediate member 10. The latch means is positive and dependably holds the device in place while the side S or carcass is handled and moved about. The device arranged against the inner side of the loin portion L in the manner described above operates to form or shape the loin portion and remove all the depressions and undesirable irregularities therefrom. Fig. 2 of the drawing illustrates the device in the operative position against the inner side of the loin portion L and shows the manner in which the device shapes or forms the loin portion to give it the desired symmetrical and pleasing shape.

Following the chilling or refrigeration of the carcass or side S the device may be removed for use on another side or carcass. As the side S chills the surfaces of the members 10, 11 and 12 may adhere to the interior of the loin portion L or the device may become frozen to the loin portion. To remove the device the operator grasps the handle grip 15 and depresses the spring 25 to release the latch fingers 29 from the catches 23. The operator then applies an outward force and a lateral force to the handle grip 15 to swing or rock one member 11 or 12 and the body member 10 out of engagement with the meat or side. A force applied to the handle grip 15 in this manner operates to pivot the intermediate or body member 10 relative to the member 11 or 12 that may remain adhered to the side or carcass and swings the other member 11 or 12 away from the side or carcass thus simultaneously freeing two members from possible adhering contact with the side or carcass. This initial removing operation also disengages the teeth 18 of the member 11 or 12 thus freed. The operator may then apply an outward force and a lateral force in the other direction to the handle grip 15 to rock or swing the remaining or adhering member 11 or 12 away from the side or carcass. This, of course, entirely frees the device from the side or carcass and as the chilled or frozen side or carcass has become set or rigid its loin portion retains the proper configuration. Only one hand is necessary in removing the device from the carcass or side. The device of the present invention, embodying the three members 10, 11 and 12 hingedly or pivotally connected by the two spaced hinge connections may be easily and quickly removed or disengaged from a side or carcass even though it may be frozen to the same, and is thus far superior to previously introduced devices embodying a single hinge connection between two sections or members.

Fig. 7 of the drawing illustrates a modified form of the invention suitable for use on carcasses or sides of pork. The device illustrated in Fig. 7 includes three sections or members 10', 11' and 12' corresponding in function to the three members 10, 11 and 12 of the above described embodiment. It is undesirable to leave a broad surface of metal or other material against a pork carcass or side and the side members 11' and 12' are in the nature of open frames formed to properly shape the loin portion and yet presenting minimum surfaces for engaging the meat. In the particular structure illustrated each side member 11' and 12' includes an inner plate-like part 40 hingedly connected with the adjacent longitudinal edge portion of the member 10' by hinges or pivotal connections similar to the pivotal connections of the above-described embodiment of the invention. Each part 40 carries a frame of wire having the desired carcass forming or shaping curvature. Each wire frame may comprise spaced parallel end parts 41 and an outer part 42 extending between and connecting the end parts 41. The frames are bent or shaped at the points of connection of the end parts 41 with the outer parts 42 to have spikes or teeth 43 for biting into the carcass or side of pork.

It will be observed that the members 11' and 12' comprising the relatively narrow parts 40 and the wire frames have minimum surfaces to bear against the inner surface of the loin portion and yet may be effective in properly shaping the loin portion and preventing its distortion. The device illustrated in Fig. 7 has the same mode of operation as the previously described form of the invention.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A device for preventing distortion of a meat carcass including, two side carcass engaging members curved to conform to the normal internal contour of the carcass, and a third carcass engaging member between and pivotally connected with the side members, each member being proportioned to have substantial engagement with the carcass.

2. A device for preventing distortion of a meat carcass including, an intermediate carcass engaging member, side carcass engaging members curved to conform to the normal internal contour of the carcass and pivotally connected with the intermediate member adjacent its opposite ends, and means limiting relative pivotal movement between the members to position the members for cooperation with the carcass.

3. A device for preventing distortion of a meat carcass including, an intermediate carcass engaging member, side members curved to conform to the normal internal contour of the carcass, means swingably connecting the side members with the intermediate member, each of the members having a surface of substantial extent for engaging the carcass, and parts on the side members for biting into the carcass, the side members being individually swingable out of engagement with the carcass together with the intermediate member.

4. A device for preventing distortion of a meat carcass including, an intermediate carcass engaging member, side carcass engaging members swingably connected with the intermediate member, and releasable latch means for automatically holding the members in the carcass engaging position, the side members being individually swingable out of engagement with the carcass together with the intermediate member.

5. A device for preventing distortion of a meat carcass including, an intermediate carcass engaging member, side carcass engaging members swingably connected with the intermediate member, means for limiting relative swinging movement between the members to stop them in the carcass engaging positions, and releasable latch means for automatically holding the members in the carcass engaging position, the side members being individually swingable out of engagement with the carcass together with the intermediate member.

6. A device for preventing distortion of a meat carcass including, two side members for engaging the carcass, a third member between and pivotally connecting the side members and having a substantial surface for engaging the carcass, and handle means on the third member whereby the side members may be individually rocked free of the carcass together with the third member by force applied to the third member.

7. A device for preventing distortion of a meat carcass including, two side members for engaging the carcass, a third member between and pivotally connecting the side members and operable to engage the carcass, a handle on said third member whereby the side members may be individually rocked out of contact with the carcass together with said third member, and means for releasably latching the members in the carcass engaging positions.

8. A device for preventing distortion of a meat carcass including, two side members for engaging the carcass, a third member between and pivotally connecting the side members and operable to engage the carcass, a handle on said third member whereby the side members may be individually rocked out of contact with the carcass together with said third member, and means for releasably latching the members in the carcass engaging positions, said means including a part engageable by the hand grasping the handle and operable to release said means.

9. A device for preventing distortion of a meat carcass including, two side members for engaging the carcass, a third member between and pivotally connecting the side members and operable to engage the carcass, a handle on said third member whereby the side members may be individually rocked out of contact with the carcass together with said third member, and means for releasably latching the members in the carcass engaging positions, said means including catches on the side members, and a latch carried on the third member for cooperating with the catches.

10. A device for preventing distortion of a meat carcass including, two side members for engaging the carcass, a third member between and pivotally connecting the side members and operable to engage the carcass, a handle on said third member whereby the side members may be individually rocked out of contact with the carcass together with said third member, and means for releasably latching the members in the carcass engaging positions, said means including catches on the side members, a latch for cooperating with the catches, and a spring carrying the latch and engageable by the hand grasping the handle to release the latch from the catches.

11. A device for preventing distortion of a meat carcass including, two frame-like side members curved to conform to the internal contour of the carcass, and a third member between and pivotally connected with the side members and having a surface for engaging the carcass.

12. A device for preventing distortion of a meat carcass including, two side members for engaging against the carcass, prongs on the outer ends of the side members for engaging in the carcass, a third member between and spacing the side members, pivotal connections between the side members and the third member, and means for latching the members against relative pivotal movement in positions where the prongs are engaging in the carcass and the members are all engaging against the carcass.

13. A device for preventing distortion of a meat carcass comprising, a plurality of members for engaging the carcass, means pivotally connecting the adjacent ends of adjacent members whereby the members may be individually swung to assume positions to prevent deformation of the carcass, the pivotal axes of the spaced members being substantially parallel, and latch means for releasably holding the members in said positions.

14. A device for preventing distortion of a meat carcass including, three sections, and means pivotally connecting the sections whereby they may present a broad surface for conforming to the internal contour of the carcass to maintain its shape.

15. A device for preventing distortion of a meat carcass comprising, a plurality of members for engaging against the carcass, spaced means pivotally connecting the ends of adjacent members whereby the members may assume positions where they conform to the normal internal contour of the carcass to prevent deformation of the carcass, and parts on the members cooperable when said positions are reached to latch the members in said positions.

16. A device for preventing distortion of a meat carcass including, two transversely curved plate members shaped to conform to the normal internal contour of the carcass, a third member positioned between adjacent ends of the said members having a surface for engaging the carcass, and pivotal connections between the third member and said ends of the said members.

17. A device for preventing distortion of a meat carcass including, three plate-like sections, and means pivotally connecting the sections for relative movement to positions for cooperation with the carcass to shape the same, said members presenting a continuous unbroken surface for contacting the carcass when in said positions.

IRVING GEFFNER.